July 15, 1952 — G. A. BOLE — 2,603,570
CERAMIC PROCESS
Filed Oct. 28, 1949
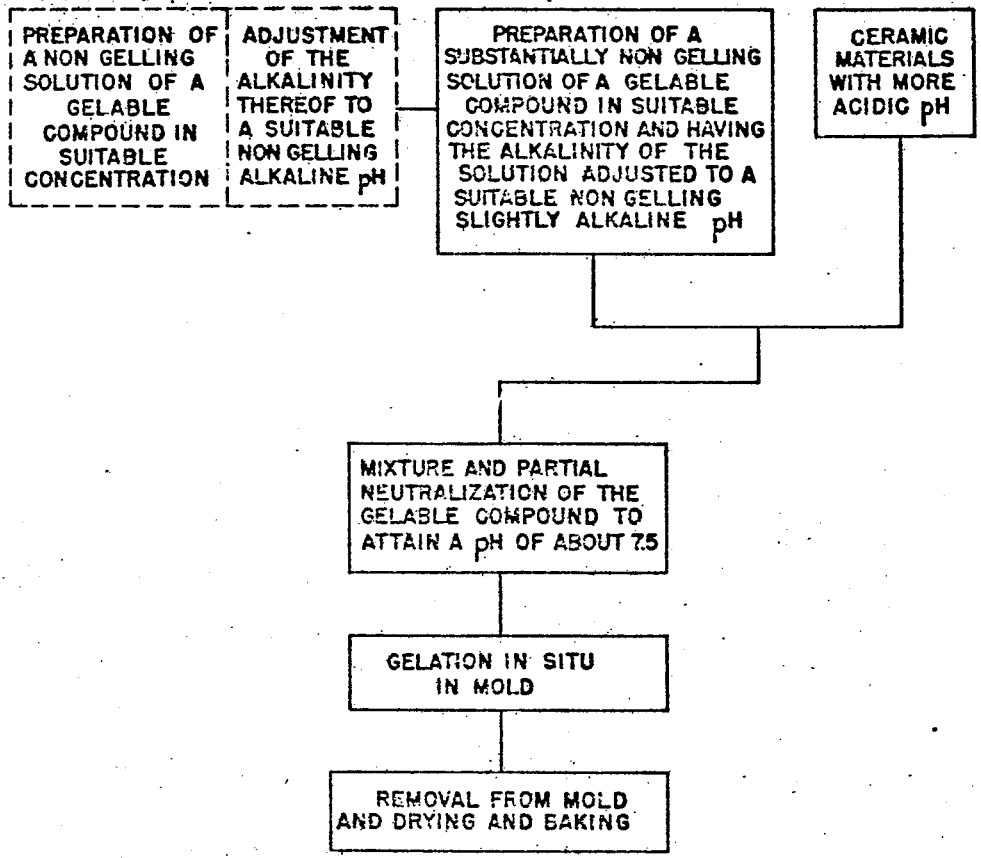
INVENTOR
GEORGE A. BOLE
BY
ATTORNEYS Patented July 15, 1952

2,603,570

UNITED STATES PATENT OFFICE 2,603,570

CERAMIC PROCESS

George A. Bole, Columbus, Ohio, assignor to The Ohio State University Research Foundation, Columbus, Ohio, a corporation of Ohio Application October 28, 1949, Serial No. 124,159

14 Claims. (Cl. 106—41)

My invention relates to improvements in the methods previously used for the manufacture of molded ceramic products. These improvements are useful in manufacturing many such products including ceramic products which may be used for structural purposes, for sound insulation, for heat insulation, for refractories and for other purposes. In this process, novel intermediate products are produced. My invention comprises the preparation of a gelling ceramic product which has a commercially workable non-granular and uniform structure. In so doing I may first prepare a solution of a silicate (e. g. sodium silicate) preferably having a resulting concentration of silica $(SiO_2)$ between about 0.75% and 2.4% and having a pH value so that the solution will not gel within any reasonable time. I may then adjust the pH thereof so that the pH is reduced but is still sufficiently above the neutral point that rapid gelation will not occur, but such that nevertheless when the solution is mixed with a ceramic material the pH of the mix will be in a gelation range (preferably between 7.2 to 7.9). By these improvements over the prior art process, I am able to achieve a commercially satisfactory process and product.

One object of the present invention is to provide a method for producing ceramic products rapidly in molds in such a way as substantially to prevent the cracking of the product.

Another object is the formation of a non-granular, gel ceramic body structure usable as an intermediate in the manufacture of the final ceramic product.

A further more specific object of the invention which aids in the accomplishment of the foregoing objects is the provision of a process for the formation of a uniformly dispersed, mobile, non-rigid, non-granular, relatively quick setting structure which consists of a mixture of a ceramic material and a gelling material.

I have found that when I form a mixture of compounds, one of which is subject to gelation and another of which is a ceramic material and provided I control substantially within certain ranges the concentration of the gelling compound and the pH of the mixture, I can uniformly secure a gelling ceramic product which has a commercially workable non-granular structure.

It is known that certain clay materials react with sodium silicate to form complex silicates and/or to replace the sodium ion of the silicate with another base. When a proper concentration of a sodium silicate solution reacts with an acid under certain conditions, the solutions become gels. The time period of this gelation depends largely upon the concentration, temperature and acidity or alkalinity of the gelling solution (i. e. the pH of the solution). At a pH near neutrality the gelation of such a solution may occur quickly but at higher pH values, the time is longer and at low pH values the time is infinite.

I have discovered that a non-granular gelled ceramic structure may be formed in situ in a mold by (1) preparing a liquid batch which consists of a water solution of a water soluble silicate, the latter being partially neutralized to a pH which is just above the rapid gelling point by the addition of an acid or an acid salt and (2) adding a dry or liquid ceramic batch to the liquid silicate batch, the ceramic batch being more acidic than the silicate solution and usually being actually acidic.

I here point out that there are definite required limits for the pH of the mix in order to secure satisfactory results and not only is a control of the pH necessary but also a control of the concentration of the gelling agent is necessary and that the degree of concentration modifies the limits of the necessary pH. The limitations on the range of conditions of the mix are very definite.

I have found that if I precondition a silicate solution to bring it to a proper condition of silicate concentration and hydrogen ion concentration and then mix with the ceramic material and allow the gel to form in situ in a mold, I eliminate the cracking and spoilage difficulties.

Thus, to recapitulate, I may point out there are three ways of adding the pH conditioner (in my process, the conditioner is an acid):

(1) After the mixture of ceramic material and gelling agent;

(2) To the ceramic material before mixture; and (3) To the gelling agent before mixture.

I have found that the last method is most advantageous because thereby I can prevent granular formation and consequent cracking and also I can in connection therewith, by proper control also of the concentration of the gelling compound, also control the time of gelation. In some embodiment of my process, I find a rapid gelation advantageous. In other embodiments, I prefer to have the gelation proceed more slowly. For example, where a conveyor is used to transport the filled molds to a drying furnace, it is desirable that the gelling time shall substantially coincide with the time the mold is on the conveyor. I control the time of gelation by control of the concentration and of the pH.

In the drawings:

The figure is a flow sheet illustrating a process performed in accordance with my invention.

Referring especially to the figure of the drawing it may be noticed that the first step illustrated as coming under my invention is the preparation of a substantially non-gelling solution of a gelable compound in suitable concentration and having the alkalinity of the solution adjusted to a suitable non-gelling slightly alkaline pH. A further step comprises the mixing of this adjusted gelable solution with the ceramic material for which it has been adjusted, the ceramic material having a more acidic pH than the solution so that the mixture is partially neutralized to obtain a pH which is slightly alkaline but within the relatively quick gelling non-granular forming range. The mixing might take place in the mold but preferably the materials are mixed outside of the mold and the mixture is poured into a mold where gelation occurs relatively rapidly. Thereafter, the product is removed from the mold, dried in a drying oven, and baked in a firing oven.

Although I prefer first to form the solution of the gelable compound by thoroughly dissolving a silicate in an adequate quantity of water and thereafter to adjust the solution to the desired degree of alkalinity for mixing with the ceramic material in question, yet it is wholly possible to obtain the same result in different ways. For example, I may dissolve sodium silicate in a suitably diluted solution of sulfuric acid, the proper proportion of the ingredients having been determined in advance either empirically or by computation. Usually, however, I perform the process as follows:

I first prepare a non-gelling solution of a gelable compound in the desired concentration and thoroughly dissolve the solute. Then second, I adjust the alkalinity thereof, to a suitable non-gelling alkaline pH. The pH of this mixture may vary and depends on the acidity of the ceramic material which is to be added thereto. The operable pH value of the adjusted non-gelling solution of the gelable compound may lie anywhere between 8.0 and 10.0 or perhaps higher or lower. In the performance of my process I usually prefer that the adjusted pH lie between 8.0 and 9.0. These limits are not critical but are furnished as an aid in performing the process. The two steps may be considered as the single step of preparing an adjusted non-gelling solution of a gelable compound in suitable concentration with a suitable non-gelling alkaline pH. Thereafter, the solution is mixed with the ceramic material, which has a more acidic pH, so that the mixture attains a gelling pH which is slightly alkaline but is not far removed from a neutral solution.

I prefer a pH of about 7.5 in the set gel which is thus the preferred pH factor of the complete mixture of the silicate solution and the ceramic material, the silicate being in suitable concentration. However, a variation of a few tenths in the pH factor does not prevent the proper operation according to my improved process. As later explained, I usually operate in the range between 7.2 and 7.9.

The complete fluid mixture of silicate and ceramic material is poured into a suitable mold and is allowed to gel in the mold. In a short time the molded product becomes stiff and can be removed from the mold and placed in the drying and baking ovens where it is dried and baked to form a finished ceramic product of high quality and desirable characteristics.

Although other soluble silicates than sodium silicate are usable as will be explained hereafter, yet sodium silicate is probably the cheapest now available and in illustrating the desired concentration of solute and degree of alkalinity, it is convenient to refer to solutions of sodium silicate.

The pH of a water glass solution increases with increasing concentration of the silicate. Although pure water is substantially neutral, and very small concentrations of sodium silicate in water are also substantially neutral, the alkalinity of a solution increases with increased concentration of the sodium silicate until, for example, a sodium silicate solution with the concentration developed by adding about 80 cc. of a 24.5% $SiO_2$ sodium silicate solution to 1000 cc. of water has a pH of about 11.0. Moreover, I have found that while an unadjusted solution of sodium silicate having a very low concentration will not gel substantially under any circumstances and even as the concentration of water glass in the solution increases, no gelation ordinarily occurs unless there is an excessively high concentration and so long as the pH of the solution is not adjusted as for example by the addition of other substances, nevertheless, if the pH is reduced by acidifying the solution, such solution will gel at a fairly definite alkaline range (dependent on its concentration) as the solution approaches a neutral alkalinity. Moreover, I have found that the breadth of the gelation range measured on the pH scale increases as the concentration increases, but that at the same time, the tendency of the solution to become granular quickly during the gelation process also increases as the concentration of the solution is increased. I prefer a concentration of $SiO_2$ in the silicate solution of between 0.75 and 2.4%.

By this I do not mean that any solution within the above mentioned limits of concentration may be satisfactorily gelled at any point within the above mentioned limits of pH. For instance, the satisfactory range of pH values corresponding to a concentration of 0.75% is relatively narrow. It is also relatively low having a range about as broad as 0.01 at a pH value of about 7.2 as, for example, extending from 7.195 to 7.205. On the other hand, the satisfactory range of pH values for a solution having a concentration of from 2.0% to 2.3% is relatively broad extending from about 7.3 to about 7.9. Concentrations of about 2.2% and higher have a very short gelation period. Because of the narrow range at low concentrations and because of the very rapid gelation in the higher concentrations and the possibilities of accidental crystal formation in such higher concentrations, I usually prefer to operate in a concentration range of from 1.2% to 2.1% and to cause gel formation thereon at a pH value of from about 7.3 to about 7.8.

The concentration of $SiO_2$ is important in the performance of the process but is no more important than the limits of pH values mentioned.

I may use any suitable gelling compound. For instance, any of the soluble silicates including the alkali silicates such as potassium silicate, sodium silicate and lithium silicate may be used; and the soluble alkyl silicates such as, for example, ethyl silicate, are usable although some, as for example, alkyl silicates, are usually now too expensive. Sodium silicate, because of its cheapness, is usually preferred. The concentrations of the silicate in a water solution of sodium silicate obviously depends partly upon the composition of the sodium silicate and I therefore consider it more accurate to express concentrations of solute as a percentage of the amount of $SiO_2$ in solution. Thus, "N" brand of silicate of soda contains 28.7% of $SiO_2$; 8.9% of $Na_2O$; and 62.4% $H_2O$. If it is mixed in water in a ratio of one part of the silicate of soda to from 11 to 37 parts of water, a dilute solution will be obtained having the preferred concentration of the $SiO_2$ content. "O" brand is of the same ratio as "N" brand, but slightly more concentrated and therefore requires slightly less additional water to create a solution of the preferred concentration. Similarly, if the "S" special brand of silicate of soda (containing 25.3% $SiO_2$; 6.75% $Na_2O$; and 67.95% of water) is mixed in a ratio of 1 part of silicate of soda to from 10 to 33 parts of water, a solution will be obtained with the preferred $SiO_2$ content. It is noted that these brands of silicate of soda have a ratio of $Na_2O$ to $SiO_2$ in the range of from 1-3 to 1-4. Preferably, silicates of soda having such ranges will be used inasmuch as in considering concentrations, the silica content is the most material factor and it is more economical to use water glass solutions having such relatively higher silica content.

The concentration of soluble silicate in the liquid batch is important in the invention in that the non-granular gel may be obtained within a relatively narrow range of concentrations. Solutions having the preferred range of concentration, may, for example, be obtained by preparing approximately 3 to 8% solutions of "N" brand or "S" special brand sodium silicate which are both commercially available.

Such solutions normally have a pH of approximately 8.5 to 11. If the $SiO_2$ content is increased above the above specified limits, gels form very rapidly and the gels which are formed tend to be granular and are not preferred in the present process. If the $SiO_2$ content is decreased, below 0.75, the gelation step requires that the pH must be held within a very narrow range near to a rating of 7.2. If the decrease in concentration is much below the 0.75% specified, a relatively long period of time is required for the gels to form or they do not form at all. Solutions containing 0.75% $SiO_2$ may take up to six hours to gel while solutions containing 2.3% $SiO_2$ will form a non-granular gel in the very rapid time of from five to ten minutes.

The adjustment of the alkalinity of the solution in preparation for the desired reaction with the more acidic ceramic constituents may be accomplished by any suitable acid. In the examples shown hereafter, I have used sulfuric acid although it will be well understood by those skilled in the art that other acids are suitable. Sulfuric acid will usually be used because of its low cost and ready availability, but I may employ any other suitable acid agent such as hydrochloric, phosphoric, and the acid sulfates, and other salts that hydrolyze to form strong acids.

The alkaline acid characteristics of the solution are changed by this step so that when the more acid ceramic materials are subsequently added thereto, the mixture will have a pH of from 7.2 to 7.9. The amount of acid to be added may be determined by calculation by obtaining the pH of the ceramic materials and the pH and concentration of the silicate solution and then computing the amount of acid required to combine with the mixture to cause the pH thereof to have a value within the desired range. I prefer, however, to estimate this requirement. Then by experimentation with small sample of the silicate solution, the estimated amount of acid, and a corresponding small sample of the ceramic material I obtain an experimental mixture. I then measure the pH of the mixture and thus determine whether more or less acid will be required to insure that the pH of the final product is substantially within the desired range.

As suggested above, the order and details of the dilution of the silicate and the adjustment of the pH thereof may be varied. The acid may be added to the water before the silicate is dissolved if desired. As a practical matter, however, the acid and the silicate will usually each be in solution and the two solutions will be mixed with each other. The concentrations of the two solutions will be substantially immaterial so long as the concentration of the silica in the final gelling mixture is substantially within the desired range.

Moreover, as pointed out heretofore, the dilution and the adjustment are in reality merely parts of the single method step which is that of preparing a gelable solution with a suitable non-gelling alkaline pH which is less alkaline than the alkalinity of a normal solution of the silicate in the concentration of silica present.

The second step comprises the mixing of the gelable solution with a wet or dry ceramic batch so as to secure a mixture having a pH lying substantially in the range of from 7.2 to 7.9. Any mixture having such characteristics is acceptable and even those having a pH slightly higher or lower, may be used at times.

Although my invention is not entirely directed to the formation of light weight cellular clay products but is also useful in the formation of relatively heavy ceramics, yet it is especially useful in producing such light weight cellular products which may be used in heat and sound insulation. Such products may be formed by mixing with the ceramic material of my process, sawdust or other organic or combustible material which may be burned out in the firing process to leave such pockets. Such light weight cellular products may also be formed by combining with the process described either a chemical bloating or foaming process to form preferably completely separated gas pockets in the molded mixture.

The ceramic material should be more acidic than the gelable solution sufficiently that it will cause the pH of the mixture to be within the range 7.2 to 7.9.

Most clays have acid characteristics sufficient to bring the pH of the gelable solution to the desired range since water suspensions of most clays vary in pH from 6.5 to 3.0. Where the ceramic materials (e. g. shales and some clays) have a more alkaline pH than 6.5, it may be necessary to adjust the pH thereof by adding an acid or acid material thereto. Sawdust has a pH value varying from 5.5 to 4.0 when suspended in water. After addition of the ceramic material to the gelable solution the pH of the batch is preferably brought to the preferred range of about 7.3 to 7.8 at which point a non-granular self-supporting gel structure will be formed in a relatively short time. The mixture is poured into a mold and the gel forms in the mold from which it is easily removed, dried and fired in the usual manner to produce the ceramic products desired.

The ceramic material may be of many kinds. Thus, Ohio fire clays from southern Ohio, Lower Kittanning fire clays, Thomas Alabama fire clays, Ohio shale and silt, and kyanite have been used. Also, I have used various clays from Stark County, Ohio; Olive Hill, Kentucky; from Georgia; northern Illinois; and from Missouri. As is stated above, sawdust may be mixed with clay and I have used both hardwood sawdusts and softwood sawdusts.

The following examples are given to illustrate the invention. However, it is to be understood that the invention is not limited thereto.

Example I

A liquid batch was prepared by adding 150 grams of silicate of soda ("N" brand) to 2700 grams of water. This solution, having a pH of 10 when formed was partially neutralized to a pH of 8.5 by the addition thereto of 12 cc. of concentrated sulfuric acid.

A dry batch was formed separately by mixing 2100 grams of raw cyanite (100 mesh) plus 1500 grams of Thomas Alabama fire clay (pH 3.05) and 600 grams of softwood sawdust (pH 5.5) (20 mesh—Tyler screen).

The dry batch was introduced slowly with continuous stirring into a receptacle containing the liquid batch until a uniform mixture was obtained. Approximately five minutes was required for the mixing operation. The mixture was transferred to a metal mold and allowed to stand for fifteen minutes. During this time the pH of the batch gradually decreased to approximately 7.5. The self-supporting, non-granular gel structure so formed was transferred from the mold to a drier maintained at a temperature of 220° F. and dried. The ceramic block was dried without substantial shrinkage and without cracking. The block was then subjected to high temperature kiln firing.

Example II

A liquid batch was prepared by adding 150 grams of sodium silicate ("S" special brand) to 2000 grams of water. This solution having a temperature of 76° F. and a pH of 10.78 when formed was partially neutralized to a pH of 9.32 by the addition thereto of 7 cc. of sulfuric acid s. g. 1.84.

A dry batch was formed separately by mixing 2000 grams of raw kyanite (200 mesh), pH 5.05 plus 1000 grams of Thomas Alabama fire clay (pH 3.67) plus 150 grams of calcined alumina and 200 grams of softwood sawdust (−28+100 mesh), pH 5.0.

The dry batch was introduced slowly with continuous stirring into a receptacle containing the liquid batch until a uniform mixture was obtained. After mixing for three minutes, the mixture was cast in a metal mold and allowed to stand for twelve minutes. The pH of the mixture decreased to 7.62 and after nine minutes, set to a self-supporting, non-granular gel structure. After an elapsed time of fifteen minutes from starting to mix, the unit was transferred from the mold to a drier, maintained at a temperature of 200° F. and dried. The unit, which dried without cracking, was then subjected to high temperature kiln firing. It was a satisfactory low weight refractory product.

Example III

A liquid batch was prepared by dissolving 150 grams of sodium silicate ("O" brand) in water to form 2000 grams of solution. This solution having a temperature of 84° F. and a pH of 10.99 when formed was partially neutralized to a pH of 8.40 by the addition thereto of 108 cc. of a solution containing 10% of sulfuric acid, s. g. 1.84.

A dry batch was formed separately by mixing 1600 grams of No. 5 Lower Kittanning fire clay (−35 mesh, pH 6.28) and 160 grams of softwood sawdust (−28 mesh, pH 4.20).

The dry batch was introduced slowly with continuous stirring into a receptacle containing the liquid batch until a uniform mixture was obtained. After mixing for three minutes the mixture was cast in a metal mold and allowed to stand for twelve minutes. The pH of the mixture decreased to 7.86 and set to a self-supporting non-granular gel in ten minutes. After an elapsed time of fifteen minutes from starting to mix, the unit was transferred from the mold to a drier, maintained at a temperature of 220° F. and dried. The unit, which dried without cracking was then subjected to high temperature kiln firing. It was a satisfactory low weight structural unit.

Example IV

A liquid batch was prepared by dissolving 60 grams of sodium silicate ("S" special brand) in water to form 1000 grams of solution. This solution, having a temperature of 82° F. and a pH of 10.79 when formed, was partially neutralized to a pH of 8.40 by the addition thereto of 31.3 cc. of a solution containing 10% of sulfuric acid, s. g. 1.84.

A dry batch was formed separately by mixing 1000 grams of No. 5 Lower Kittanning fire clay (−100 mesh, pH 6.28) and 500 grams of ground flint (−200 mesh, pH 6.90). The dry batch was then added slowly to the liquid batch and mixed thoroughly until a uniform mixture was obtained. Gas pockets were formed by a foaming process. After mixing a total of one minute and forty-five seconds the mixture was cast in a metal mold and allowed to stand for ten minutes. The pH of the mixture decreased to 7.80 and it set to a self-supporting non-granular gel in eight minutes. After an elapsed time of twelve minutes from starting to mix, the unit was removed from the mold and dried, first in atmospheric conditions and finally in a drier maintained at a temperature of 220° F. The unit, which dried without cracking, was then subjected to high temperature kiln firing. It was a satisfactory low weight structural product.

It is to be understood that the above described embodiments of my invention are for the purpose of illustration only and various changes may be made therein without departing from the spirit and scope of the invention.

I claim:

1. In a method of making ceramic products, the steps which comprise forming a solution of a soluble silicate in water; reducing the pH value of said solution by introducing therein an acid reagent in quantities insufficient to effect rapid gelation of the solution; thereafter, but before the solution has gelled, mixing ceramic materials selected from the class of ceramic materials consisting of clays, silts, shales and kyanites having an acid-reacting character into the solution to form a slurry in quantities sufficient to create a pH value of the slurry within a range substantially of from 7.2 to 7.9 and casting the slurry in a mold.

2. A method of making a ceramic product, comprising the steps of producing a solution composed of a soluble silicate in water; introducing an acid reagent into said solution in quantities to cause the same to acquire a pH value, intermediate that of a normal solution of the silicate in water, and a solution which will rapidly gel; thereafter, but before the solution has gelled, mixing into said solution an acid-reacting ceramic material selected from the class of ceramic materials consisting of clays, silts, shales and kyanites to form a slurry having a pH of about 7.2 to 7.9 and introducing the slurry into a mold, whereby a gel forms and stiffens to set the slurry to cause it to assume a stiff and set-up condition.

3. In a method of making ceramic products, the steps which comprise forming a dilute solution of a soluble silicate in water having had the pH value of said solution reduced from the pH value of a normal solution by the presence of an acid reagent in quantities insufficient to effect rapid gelation of the solution; thereafter, but before the solution has gelled, mixing clay into the solution to form a slurry; and casting the slurry into a mold, the clay being of an acid-reacting character when in aqueous solution and being present in the slurry in quantities sufficient to create a pH value in the slurry when cast at about 7.5.

4. The method of making a light weight ceramic refractory which comprises forming of a non-gelling water solution of a water soluble silicate, having said solution partially neutralized to a non-gelling slightly alkaline pH; forming a dry mixture composed of clay and a finely divided combustible cellulose material, said dry mixture being of an acidic character; mixing the dry mixture with the ungelled silicate solution to form a slurry having a pH of about 7.2 to 7.9; and molding the slurry, the acidic character of the ingredients comprising the dry mixture serving to effect further neutralization of the silicate solution and a development of a gel in the slurry following the casting thereof.

5. The method of making ceramic refractories which comprises adding an acidic clay to a partially neutralized ungelled solution of a water soluble silicate; and casting the resulting mixture.

6. A method of producing a ceramic product which comprises forming a partially neutralized dilute solution of a soluble silicate in water, the neutralization being insufficient to cause rapid gelation thereof; adding to said partially neutralized solution before it has gelled, dry materials in the form of an acid containing clay to form a mixture having a pH of 7.2 to 7.9; and casting the resulting mixture, the naturally contained acids present in the clay serving to effect further neutralization of the solution into a gelation range in order to form in situ in the cast materials a mobile, non-granular uniformly distributed gel.

7. The method of producing ceramic products which comprises forming a dilute solution of a soluble silicate in water having a concentration of $SiO_2$ in the silicate solution of between 0.75% and 2.4%; partially neutralizing said solution by the addition thereto of an acid reagent; adding to said partially neutralized solution before it has gelled, dry materials in the form of an acid containing clay, kyanite and a finely divided combustible cellulose material; casting the resulating mixture in a mold; retaining the mixture in said mold for a sufficient period of time so that the naturally contained acids present in the clay and said organic substance serve to effect further neutralization of the solution forming materials so as to achieve a pH between 7.2 and 7.9, whereby to effect development in said materials of a uniformly distributed, non-granular silicate gel; following the setting of said materials, removing the same from the mold and drying the same; and thereafter firing the product at high temperature.

8. A method of making a ceramic product, comprising the steps of producing a solution composed of a soluble silicate in water having a concentration of silica in the water of from 1.2 to 2.1%; introducing an acid reagent into said solution in quantities to cause the same to assume a pH value of between 8.0 and 9.0 but which does not at the concentration of the silicate in solution cause it to form a gel rapidly; thereafter mixing said solution before it has gelled, with an acid-reacting ceramic material selected from the class of ceramic materials consisting of clays, silts, shales and kyanites to form a slurry and to cause the slurry to acquire a pH value between about 7.3 and 7.8; and then introducing the slurry into a mold, whereby a gel gradually forms and stiffens to set the slurry to cause it to assume a stiff and set-up condition.

9. A method of making a ceramic product, comprising the steps of producing a dilute solution composed of a soluble silicate in water, having a concentration of silica in the water of from 0.75 to 2.4%; introducing an acid reagent into said solution in quantities to cause the same to acquire a pH value of from 8.0 to 10.0 without neutralizing said solution sufficiently to cause the rapid formation of a gel; thereafter, before said solution has gelled, mixing into said solution an acid-reacting clay to form a slurry and to cause the slurry to acquire a pH value between about 7.2 and 7.9; and introducing the slurry into a mold whereby a gel forms and stiffens to set the slurry to cause it to assume a stiffened condition.

10. In a method of making ceramic products, the steps which comprise forming a solution of a soluble silicate in water; reducing the pH value of the solution by introducing therein an acid reagent in quantities sufficient to create a pH value within the range of from 8.0 to 10.0; thereafter mixing clay and a finely divided sawdust into the ungelled solution to form a slurry; and casting the slurry in a mold, the clay and the organic material being of an acid-reacting character when in aqueous suspension and being present in the slurry in quantities sufficient to create a pH value of the slurry, when cast within the range of from 7.2 to 7.9.

11. In a method of making ceramic products, the steps which comprise preparing a non-gelling dilute aqueous solution of a soluble silicate compound having the alkalinity of said solution adjusted to a non-gelling slightly alkaline pH value; mixing clay into the ungelled solution to form a slurry; and casting the slurry in a mold, the clay being of an acid-reacting character when in aqueous suspension and being present in the slurry in quantities sufficient to create a pH value of the slurry when cast within the range of from 7.2 to 7.9.

12. In a method of forming a light weight cellular ceramic product, the steps which comprise producing a dilute solution of a soluble silicate in water; introducing into said solution an acid reagent in amounts necessary to partially neutralize the same without effecting rapid gelation thereof; forming a dry mixture composed of a finely divided acidic clay and a combustible cellulose material; intimately mixing the materials comprising the dry mixture with those forming the ungelled silicate solution to produce a casting slurry; and introducing the slurry into a mold, the acidic character of the dry materials when wetted serving to reduce the pH value of the partially neutralized sodium silicate solution so that the slurry acquires after being cast in the mold, a pH value of from 7.2 to 7.9 whereby there is developed within the cast materials, a mobile, non-granular gel.

13. An intermediate product in the formation of a ceramic product comprising a dried molded form of a gelled non-crystalline structure consisting of a mixture of a solution of a soluble silicate and a ceramic material selected from the class of ceramic materials consisting of clays, silts, shales and kyanites, the mixture having a pH in the range between 7.2 and 7.9.

14. An intermediate product in the formation of a ceramic product comprising a molded form of a gelled non-crystalline structure consisting of a mixture of an ungelled solution formed from a soluble silicate and a ceramic material selected from the class of ceramic materials consisting of clays, silts, shales and kyanites, the mixture having a pH in the range between 7.2 and 7.9 and having a concentration of from 0.75 to 2.4% of $SiO_2$ to water.

GEORGE A. BOLE.

REFERENCES CITED

The following references are of record in the file of this patent:

UNITED STATES PATENTS

| Number | Name | Date |
|---|---|---|
| 2,268,131 | Barker et al. | Dec. 30, 1941 |
| 2,318,753 | Carter | May 11, 1943 |
| 2,527,390 | Blaha | Oct. 24, 1950 |